United States Patent [19]

Heath

[11] 4,267,686
[45] May 19, 1981

[54] LAWN MOWER HAVING FLEXIBLE FILAMENT CUTTER ELEMENTS

[76] Inventor: Charles A. Heath, 2239 N. River Rd., Saint Clair, Mich. 48079

[21] Appl. No.: 44,045

[22] Filed: May 31, 1979

[51] Int. Cl.$^3$ ............................................. A01D 53/14
[52] U.S. Cl. ..................................... 56/12.7; 56/292; 30/347
[58] Field of Search ................ 56/12.7, 290, 291, 292, 56/295; 30/276, 347, 380

[56] References Cited

U.S. PATENT DOCUMENTS

| | | | |
|---|---|---|---|
| 1,851,840 | 3/1932 | Huff | 56/292 |
| 2,073,145 | 3/1937 | Flint | 15/380 |
| 2,711,761 | 6/1955 | Grants | 30/380 |
| 2,728,181 | 12/1955 | Carpenter | 56/292 |
| 2,744,376 | 5/1956 | Miner | 56/290 |
| 3,139,975 | 7/1964 | Schaefer | 15/380 |
| 3,488,931 | 1/1970 | Matthews | 56/290 |
| 3,849,975 | 11/1974 | Cummings | 56/295 |
| 4,141,142 | 2/1979 | Karvbian | 30/380 |
| 4,170,099 | 10/1979 | Owens | 56/12.7 |

Primary Examiner—Robert A. Hafer
Attorney, Agent, or Firm—Robert G. Mentag

[57] ABSTRACT

A lawn mower comprising a plurality of flexible filament cutter elements carried on a continuous or endless driven belt. The lawn mower includes a plate-like frame having an arcuate front end formed as a portion of a perfect circle, on the underside of which is mounted a plurality of driven pulleys. A drive motor having a drive pulley is mounted on the frame, in a position to the rear of the driven pulleys. A drive belt is operatively mounted around the driven pulleys and around the drive pulley on the motor for driving the driven pulleys. The endless belt which carries the flexible filament cutter elements is mounted around the driven pulleys, whereby when the driven pulleys are rotated by the drive belt, the belt carrying the flexible cutter filaments is moved around the arcuate front end of the mower frame, and the filament cutter elements are moved outwardly by centrifugal force, for cutting engagement with grass and other vegetation, with a flail type cutting action.

13 Claims, 4 Drawing Figures

U.S. Patent  May 19, 1981  4,267,686
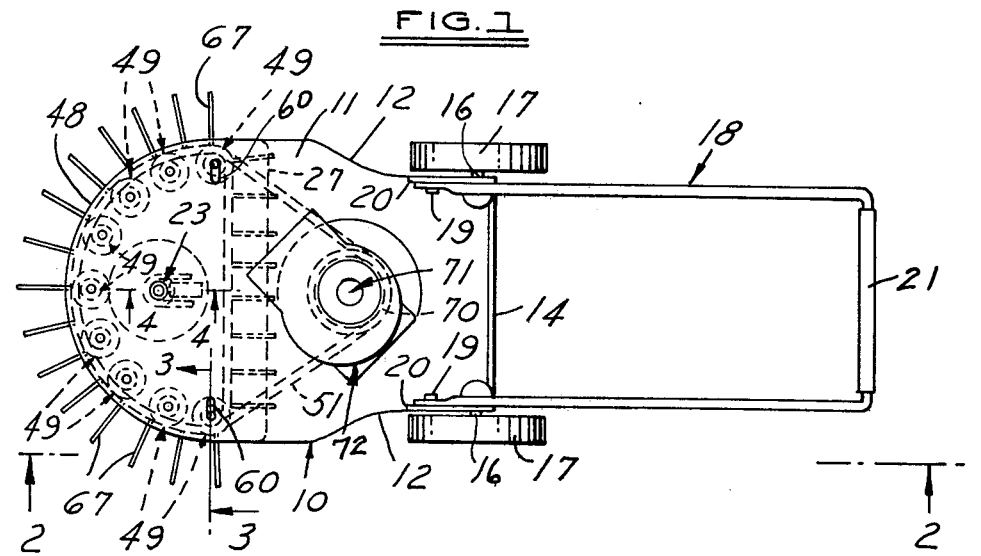
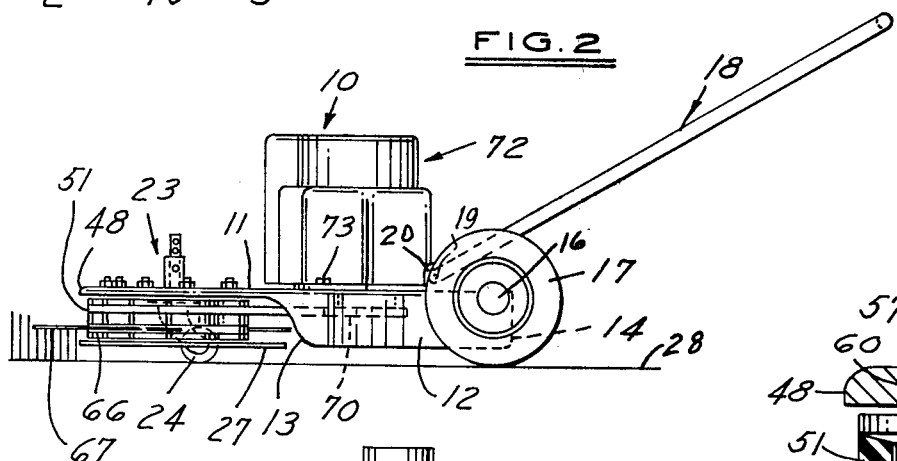
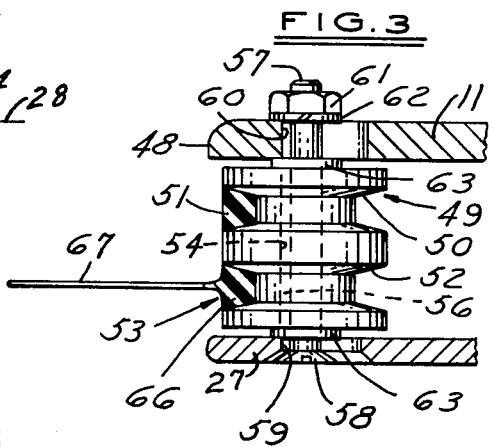
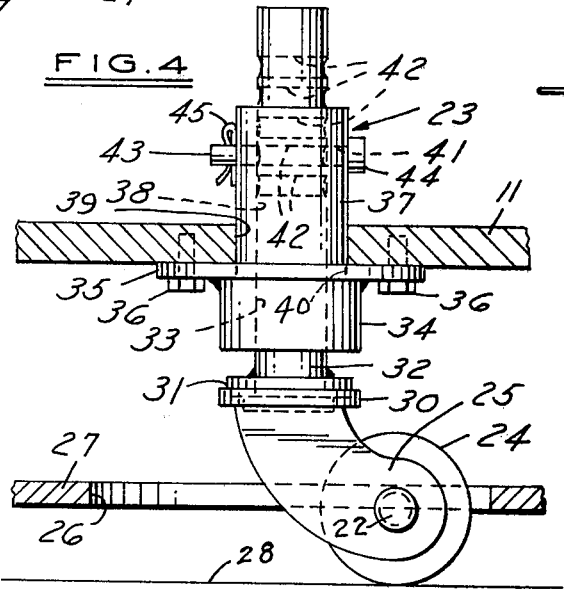

LAWN MOWER HAVING FLEXIBLE FILAMENT CUTTER ELEMENTS

BACKGROUND OF THE INVENTION

1. Field of the Invention

This invention relates to the lawn mower art, and more particularly to a novel and improved lawn mower employing flexible filament cutter elements. The invention is specifically concerned with a lawn mower having a plurality of flexible filament cutter elements mounted on a detachable continuous carrier belt for movement around a semi-circular front end of a mower frame.

2. Description of the Prior Art

It is well known in the lawn mower art to employ flexible filament cutter elements on mowers having a single rotary mounting member and used for cutting weeds, and on a rotary member for use as a lawn trimming device. Examples of such prior art mowers employing flexible filament cutter elements are illustrated in U.S. Pat. Nos. 3,826,068; 3,831,278; 3,859,776; 4,065,913; 4,077,191; 4,134,204, and 4,137,694. It is also well known to mount metal cutter elements on a continuous belt as shown in the U.S. Pat. Nos. 2,543,368; 2,728,181; 2,744,376; 2,782,582; 2,867,069; 3,043,079; 3,488,931; 3,699,757; and, 3,831,358.

A disadvantage of the prior art lawn mowers employing filament type cutter elements is that they are complex and expensive to make, and their filament cutter elements are subject to excessive breakage. The filament cutter element breakage problems of such prior art mowers is caused partly by the wear of the filament cutter elements at the tips thereof, and at the point where they extend from the spindle on the filament storage apparatus. The prior art filament cutter elements weaken at the last mentioned point where it leaves the storage spindle, due to flexing and pressure, and breakage occurs at that point which results in much down time of the mower in adjusting the storage spindle to extend a new portion of the filament to the cutting position, and such action also results in excessive usage of filament. A further disadvantage of the prior art filament cutter type mowers is that they are not constructed and arranged so that the mower can be moved adjacent a foundation or the like for cutting grass and vegetation adjacent the foundation and around objects such as trees and the like, due to the construction of the frame holding the filament cutter elements.

SUMMARY OF THE INVENTION

In accordance with the present invention, the lawn mower comprises a frame plate which has a semi-circular front end, and which frame has a pair of ground engaging wheels rotatably mounted on the rear end thereof. A handle for pushing the lawn mower is operatively mounted on the rear end of the frame. A plurality of driven pulleys are mounted on the underside of the frame plate at the semi-circular front end of the frame plate. The front end of the frame plate is supported by a single guide wheel which is swivelly attached to the underside of the frame plate, on the longitudinal axis of the frame plate, and in a position spaced rearwardly of the driven pulleys. A gasoline powered engine is operatively mounted on the frame plate in a position spaced rearwardly from the driven pulleys, and it has an output shaft on which is operatively mounted a drive pulley. A drive belt is operatively mounted around the engine drive pulley and the driven pulleys for driving the driven pulleys. An endless carrier belt is mounted around the driven pulleys. A plurality of outwardly extended, spaced apart, flexible filament cutter elements are carried on the outer periphery of an endless carrier belt.

In use, the engine rotates the driven pulleys through the drive belt, and the carrier belt is also driven around the semi-circular front end of the mower frame plate to create a sufficient centrifugal force for moving the filament cutter elements outwardly into a horizontal, grass and vegetation cutting position. The filament cutter elements may be molded integral with the carrier belt, or made separately and mounted by any suitable means on the carrier belt.

An advantage of the lawn mower of the present invention is that it is possible to trim grass and vegetation right next to any object, such as a building, or around a tree. A further advantage of the lawn mower of the present invention is that it is simple and compact in construction, economical to make, and safe in operation. The filament cutter element carrier belt can be molded integral with the plurality of filament cutter elements, and the filament cutter elements molded with a radius at the point where they join the belt, so that they have optimum strength to resist breakage at that point. The lawn mower is arranged so that the filament cutter element carrier belt can be quickly and easily detached, and replaced by a new carrier belt, when necessary. The front end of the lawn mower is formed with a semi-circular, or arcuate configuration, to provide the necessary peripheral speed for propelling the filament cutter elements outwardly to perform a flailing or cutting action on grass or other vegetation.

Other features and advantages of this invention will be apparent from the following detailed description, appended claims, and the accompanying drawing.

BRIEF DESCRIPTION OF THE DRAWINGS

FIG. 1 is a top plan view of a lawn mower made in accordance with the principles of the present invention.

FIG. 2 is a side elevation view of the lawn mower illustrated in FIG. 1, taken along the line 2—2 thereof, and looking in the direction of the arrows.

FIG. 3 is an enlarged, fragmentary, elevational section view of the lawn mower structure illustrated in FIG. 1, taken along the line 3—3 thereof, and looking in the direction of the arrows.

FIG. 4 is an enlarged, fragmentary elevational section view of the lawn mower structure illustrated in FIG. 1, taken along the line 4—4 thereof, and looking in the direction of the arrows.

DESCRIPTION OF THE PREFERRED EMBODIMENT

Referring now to the drawing, and in particular to FIGS. 1 and 2, the numeral 10 generally designates a lawn mower made in accordance with the principles of the present invention. The numeral 11 designates the frame or chassis of the mower, and it comprises a horizontal plate which has depending, integral, side guard flanges 12 on each side, at the rear end thereof. The frame plate 11 is also provided at the rear end thereof with a depending, integral, guard flange 14. As shown in FIG. 2, the numeral 13 indicates the upwardly and forwardly curved front end of each of the side guard flanges 12.

As illustrated in FIG. 1, the rear end of the frame plate 11 is supported by a pair of ground engaging wheels or rollers 17 which are mounted on the opposite sides of the frame plate 11 on suitable axles 16, by any suitable means. The lawn mower 10 is provided with a handle, generally indicated by the numeral 18, which has a handle cross-grip 21 at the rear end thereof. The front end of the handle 11 is pivotally attached to flanges, integrally attached to the rear end of the frame plate 11, by any suitable means, as by suitable bolt and nut means.

As shown in FIGS. 1, 2 and 4, the front end of the frame plate 11 is rollably supported by a suitable swivel wheel means, generally indicated by the numeral 23. As shown in detail in FIG. 4, the front wheel means 23 includes a wheel 24 which is rollably supported by a suitable axle 22 between a pair of wheel support arms 25. The upper ends of the wheel support arms 25 are attached by any suitable means to a circular conventional lower swivel member 30 which is swivelly mounted on a mating upper circular swivel member 31. The upper swivel member 31 is fixed by any suitable means, as by welding, to a vertical mounting shaft 32 which is slidably mounted to an axial bore 33 formed through a mounting cylinder 34. The mounting cylinder 34 is fixedly attached, as by welding, to the lower side of a mounting plate 35 which is attached by suitable machine screws 36 to the underside of the frame plate 11. The wheel mounting cylinder 34 has a reduced diameter upper end portion 37 which extends upwardly through a suitable bore 40 in the plate 35, and through a bore 39 in the frame plate 11. The mounting cylinder upper reduced diameter portion 37 is provided with an axial bore 38 which is aligned with the bore 33. The wheel mounting shaft 32 extends upwardly through the bore 38 and out above the upper end of the mounting cylinder portion 37. As shown in FIG. 4, the swivelly mounted guide wheel 24 extends downwardly through an opening 26 formed in a lower pulley mounting plate 27 for engagement with the ground surface 28.

The wheel mounting shaft 32 is provided with a plurality of transverse or cross bores 42 for the reception of a retainer pin 43. The wheel mounting shaft 32 is held in a vertically adjusted position by the retainer pin 43 which has an enlarged head 44, and which is adapted to be extended through a bore 41 going through the mounting cylinder 37 and through one of the respective bores 42 in the shaft 32. The retainer pin 43 is releasably secured in position by a suitable cotter key 45.

As shown in FIG. 1, the front end 48 of the frame plate 11 is arcuately formed. Preferably, the arcuate front end 48 is formed with the configuration of a true circle. In one embodiment the circular front end 48 was formed with a radius of 7½ inches. However, it should be understood that any dimension may be used, in accordance with the size of the lawn mower to be produced. As shown in FIGS. 1, 2 and 3, a plurality of driven pulleys, each generally indicated by the numeral 49, are rotatably mounted on vertical axes on the underside of the frame plate 11, around the arcuate front end 48. Each of the driven pulleys 49 is mounted with the same structure on the frame plate 11, and one of the pulleys 49 is shown in detail in FIG. 3.

As shown in FIG. 3, each of the pulleys 49 is provided with a first or upper peripheral V-groove 50 for the reception of a drive belt 51. Each of the driven pulleys 49 is also provided with a lower or second peripheral V-groove indicated by the numeral 52 for the driving reception of a filament cutter element carrier belt, generally indicated by the numeral 53. Each of the driven pulleys 49 is provided with an axial bore 52 in which is mounted a suitable bushing 56 for the reception of a mounting screw shaft 57. In the adjustable structure of FIG. 3, the head end 58 of the screw shaft 57 is mounted through a suitable slot 59 formed through the pulley mounting lower plate 27, and it is extended upwardly through the bushing 56 and through a suitable adjustment slot 60 in the frame plate 11. The lower end of each pulley 49 is spaced from the pulley mounting plate 27 by a suitable washer 63. The upper end of each of the driven pulleys 49 is spaced by a suitable washer 63 from the upper plate or frame plate 11. Each of the pulley screw shafts 57 is secured in position by a suitable washer 62 and lock nut 61. The mounting of the pulley shaft 57 in the adjustment slots 59 and 60 in the plates 27 and 11, respectively, illustrate the belt tightening structure for the two rearwardly disposed pulleys 49, as shown in FIG. 1. By means of the slots 59 and 60 (FIG. 3), the positions of the pulley shafts 57 for the two rearmost pulleys 49 may be shifted inwardly to release tension on the drive belt 51, and the cutter element carrier belt 53, to permit mounting of new belts of either type, or for tightening of these belts. The other driven pulleys 49 would have their respective mounting shafts 57 formed through circular holes in the plates 11 and 27 instead of the slots 59 and 60. As shown in FIGS. 1 and 3, the carrier belt 53 has integrally molded thereon a plurality of flexible filament cutter elements 67. The cutter elements are shown as being laterally spaced apart, in one row, around the belt 53.

The filament cutter elements 67 are formed with a radius at the junction point with the carrier belt 53 to provide extra strength at that point. As shown in FIGS. 1 and 2, a suitable conventional gasoline engine, generally indicated by the numeral 72, is operatively mounted on the frame plate 11 on the upper face thereof, and towards the rear end thereof, and it is secured in place by any suitable means, as by suitable machine screws 73. The numeral 71 in FIG. 1 generally indicates the usual starter pulley for the conventional type of two cycle or four cycle engine employed on lawn mowers. An electric motor could be used instead of the engine 72.

As shown in FIG. 2, a suitable drive pulley 70 is mounted on the output shaft of the engine 72, in a position below the frame plate 11, for operative engagement with the drive belt 51 for driving the same.

In use, the engine 72 is started in the usual way, and it drives the drive belt 51 which in turn rotates the driven pulleys 49. The rotation of the driven pulleys 49 rotates the carrier belt 53 which causes the filament cutter elements 67 to be flung outwardly into horizontal cutting positions, and in spaced apart positions, as shown in FIG. 1. The arcuate front end 48 of the frame plate 11 extends outwardly beyond the drive pulleys 49, as indicated in FIG. 3, to provide a guard for the pulleys 49 and the drive belt 51 and carrier belt 53. It will be seen that the swivelly mounted front guide wheel 24 does not roll down the grass before it is cut by the lawn mower of the present invention, which is the case in the prior art lawn mowers which have supporting wheels mounted on the outer sides thereof and in positions whereby those wheels roll down grass before it is cut by the lawn mower.

It will be understood that the semi-circular front end 48 provides a construction wherein an optimum speed is generated to provide the necessary centrifugal force to operate the filament cutter elements 67. A discussion of the required speed for the filament cutter elements 67 of the type employed in the present invention, and the desired length of the same, is set forth in detail in U.S. Pat. No. 4,134,204, and such discussion is incorporated herein by reference.

It will be understood that the flexible filament cutter elements 67 may be made to any desired length and cross sectional size, and from any suitable elastomeric or other plastic material, and the carrier belt 53 may be made of the same material if it is molded integral with the cutter elements.

It will be understood that any suitable belt tightening means may be employed, other than the type illustrated in FIGS. 1 and 3.

The filament cutter elements 67 may be spaced apart longitudinally on the carrier belt 53 at any desired distance from each other as, for example, two inches from each other. It will be understood that if a few of the filament cutter elements 67 do become detached or broken from the carrier belt 53, that the remaining cutter elements will function, but that when a minimum number of the cutter elements 67 are left on the carrier belt 53, that a new carrier belt 53 may be quickly and easily mounted on the driven pulleys 49. The filament cutter elements 67 are shown as being aligned in a horizontal row on the carrier belt 53. However, it will be understood that they could be staggered upwardly and downwardly relative to each other in any desired position. The filament cutter elements 67 may also be disposed in a plurality of rows on the outer periphery of the carrier belt 53, if desired.

While it will be apparent that the preferred embodiment of the invention herein disclosed is well calculated to achieve the results aforestated, it will be appreciated that the invention is susceptible to modification, variation and change.

What is claimed is:

1. A lawn mower having a support frame, a power drive means mounted on said frame having an output shaft, said support frame having a pair of ground engaging support wheels at the rear end thereof and a handle member operatively attached to the rear end of the frame, characterized in that:
   (a) said support frame includes a frame plate having an arcuate front end formed as a portion of a circle;
   (b) a plurality of driven pulleys are each rotatably mounted on the frame plate with their axes arcuately disposed in positions to form a portion of a circle adjacent the arcuate front end of the frame plate;
   (c) said driven pulleys are drivably connected with the power drive means output shaft; and,
   (d) an endless carrier belt is operatively mounted around the driven pulleys and provided on the periphery thereof with a plurality of laterally spaced apart, flexible filament cutter elements which are flung horizontally outward into cutting positions by centrifugal force, for cutting lawn and vegetation, when the driven pulleys are driven by the power drive means to drive the carrier belt around the arcuately disposed driven pulleys.

2. A lawn mower as defined in claim 1, including:
   (a) rollable supporting means on the front end of the frame plate for rollably supporting said plate.

3. A lawn mower as defined in claim 2, wherein:
   (a) said rollable supporting means on the front end of the frame plate comprises a swivelly mounted wheel.

4. A lawn mower as defined in claim 3, wherein:
   (a) said swivelly mounted wheel is mounted on the longitudinal axis of the frame plate, in a position rearwardly of said drive pulleys.

5. A lawn mower as defined in claim 4, including:
   (a) means for adjustably mounting said swivelly mounted wheel, for adjustment upwardly and downwardly relative to said frame plate.

6. A lawn mower as defined in claim 1, wherein:
   (a) the arcuate front end of the support frame plate is formed as a portion of a true circle.

7. A lawn mower as defined in claim 1, wherein:
   (a) the endless carrier belt is molded integrally with the plurality of flexible filament cutter elements.

8. A lawn mower as defined in claim 1, wherein:
   (a) said plurality of driven pulleys are rotatably mounted on the underside of the support frame plate.

9. A lawn mower as defined in claim 8, wherein:
   (a) at least one of said driven pulleys is adjustably mounted for belt tightening and belt changing operations.

10. A lawn mower as defined in claim 1, wherein:
    (a) said power drive means includes a drive pulley mounted on said output shaft; and,
    (b) a drive belt operatively connects said drive pulley and said driven pulleys, for rotating said driven pulleys when the power drive means is operated.

11. A cutter belt for a lawn mower comprising:
    (a) a continuous belt; and,
    (b) a plurality of flexible filament cutter elements, which are flung horizontally outward into cutting positions by centrifugal force when in use, mounted around the outer periphery of said belt and being laterally spaced apart from each other.

12. A cutter belt for a lawn mower as defined in claim 11, wherein:
    (a) said flexible filament cutter elements are molded integrally with the continuous belt in a one-piece construction.

13. A cutter belt for a lawn mower as defined in claim 12, wherein:
    (a) each of said flexible filament cutter elements is provided with an integral fillet at the junction point with the continuous belt.

* * * * *